(12) United States Patent
Hall et al.

(10) Patent No.: US 11,838,383 B2
(45) Date of Patent: Dec. 5, 2023

(54) EDGE APPLICATION CONTEXT RELOCATION AND REPLICATION

(71) Applicant: QUALCOMM Incorporated, San Diego, CA (US)

(72) Inventors: Edward Robert Hall, Bristol (GB); Alan Soloway, Erie, CO (US); Thomas Stockhammer, Bergen (DE); Imed Bouazizi, Frisco, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/233,237

(22) Filed: Apr. 16, 2021

(65) Prior Publication Data

US 2021/0337043 A1 Oct. 28, 2021

Related U.S. Application Data

(60) Provisional application No. 63/014,414, filed on Apr. 23, 2020.

(51) Int. Cl.
*H04L 67/59* (2022.01)
*H04W 88/18* (2009.01)
*H04L 67/1095* (2022.01)

(52) U.S. Cl.
CPC .......... *H04L 67/59* (2022.05); *H04L 67/1095* (2013.01); *H04W 88/182* (2013.01)

(58) Field of Classification Search
None
See application file for complete search history.

(56) References Cited

U.S. PATENT DOCUMENTS

| | | | | |
|---|---|---|---|---|
| 10,499,304 | B1* | 12/2019 | Stauffer | H04W 36/32 |
| 10,841,974 | B1* | 11/2020 | Young | H04W 8/08 |
| 2016/0337919 | A1* | 11/2016 | Bindrim | H04W 24/02 |
| 2021/0058489 | A1* | 2/2021 | Kim | H04W 36/0033 |
| 2021/0059011 | A1* | 2/2021 | Fang | H04W 80/12 |
| 2021/0075892 | A1* | 3/2021 | Chun | H04L 69/163 |
| 2021/0112137 | A1* | 4/2021 | Soloway | H04W 76/25 |
| 2021/0352156 | A1* | 11/2021 | Kim | H04L 67/51 |
| 2022/0094764 | A1* | 3/2022 | Kim | H04W 4/18 |
| 2022/0330128 | A1* | 10/2022 | Kim | H04W 28/0226 |
| 2023/0047503 | A1* | 2/2023 | Kim | H04L 67/51 |

* cited by examiner

*Primary Examiner* — Quang N Nguyen
(74) *Attorney, Agent, or Firm* — Harrity & Harrity, LLP

(57) ABSTRACT

Various aspects of the present disclosure generally relate to wireless communication. In some aspects, a user equipment (UE) may determine, by an edge enabler client of the UE, to trigger generation of a shadow application context to support an application that is associated with an application context and that is served by an edge network device. The UE may determine, by the edge enabler client, to transfer support of the application from the application context to the shadow application context, and transfer, by the edge enabler client, support of the application from the application context to the shadow application context. In some aspects, an application context may be transferred between a UE and an edge network directly, without the shadow application context. Numerous other aspects are provided.

30 Claims, 14 Drawing Sheets

EDGE APPLICATION CONTEXT RELOCATION AND REPLICATION

CROSS-REFERENCE TO RELATED APPLICATION

This Patent Application claims priority to Provisional Patent Application No. 63/014,414, filed on Apr. 23, 2020, entitled "EDGE APPLICATION CONTEXT RELOCATION AND REPLICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for edge application context relocation and replication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include triggering generation of a shadow application context to support an application that is associated with an application context and that is served by an edge network device. The method may include transferring, by an edge enabler client of the UE, support of the application from the application context to the shadow application context based at least in part on the generation of the shadow application context.

In some aspects, a method of wireless communication, performed by an edge network device, may include generating a shadow application context on the edge network device for an application supported by an application context on a UE, based at least in part on receiving an indication that an edge enabler client of the UE has triggered generation of the shadow application context. The method may include maintaining the shadow application context and supporting the application with the shadow application context based at least in part on receiving an indication that the edge enabler client of the UE has triggered a transfer of support of the application from the application context to the shadow application context.

In some aspects, a method of wireless communication, performed by an edge network device, may include transmitting, to a UE, replication data of an application context that supports an application on the UE, based at least in part on receiving an indication that an edge enabler client of the UE is maintaining a shadow application context that is able to support the application. The method may include discontinuing support of the application with the application context based at least in part on receiving an indication that the edge enabler client of the UE has triggered a transfer of support of the application from the application context to the shadow application context.

In some aspects, a method of wireless communication, performed by a UE, may include determining, by an edge enabler client of the UE, to relocate an application context that supports an application on the UE that is served by an edge network device, and causing, by the edge enabler client, relocation of the application context.

In some aspects, a method of wireless communication, performed by an edge network device, may include generating a new application context on the edge network device to support an application on a UE, based at least in part on receiving an indication that an edge enabler client of the UE has triggered relocation of an application context on the UE that supports the application, and supporting the application with the new application context.

In some aspects, a method of wireless communication, performed by an edge network device, may include receiving an indication that an edge enabler client of a UE is triggering relocation of an application context, on the edge network device, that supports an application on the UE, and discontinuing support of the application with the application context based at least in part on receiving an indication that the UE has generated a new application context to support the application.

In some aspects, a UE for wireless communication may include memory, one or more processors coupled to the memory, and instructions stored in the memory. The instructions in the memory may be operable, when executed by the one or more processors, to cause an edge enabler client of the UE to trigger generation of a shadow application context to support an application that is associated with an application context and that is served by an edge network device, and transfer support of the application from the application context to the shadow application context based at least in part on the generation of the shadow application context.

In some aspects, an edge network device for wireless communication may include memory, one or more processors coupled to the memory, and instructions stored in the memory. The instructions in the memory may be operable, when executed by the one or more processors, to cause the one or more processors to generate a shadow application context on the edge network device for an application supported by an application context on a UE, based at least in part on receiving an indication that an edge enabler client of the UE has triggered generation of the shadow application context, maintain the shadow application context, and support the application with the shadow application context based at least in part on receiving an indication that the edge enabler client of the UE has triggered a transfer of support of the application from the application context to the shadow application context.

In some aspects, an edge network device for wireless communication may include memory and instructions stored in the memory. The instructions in the memory may be operable, when executed by the one or more processors, to cause the one or more processors to memory, transmit, to a UE, replication data of an application context that supports an application on the UE, based at least in part on receiving an indication that an edge enabler client of the UE is maintaining a shadow application context that is able to support the application, and discontinue support of the application with the application context based at least in part on receiving an indication that the edge enabler client of the UE has triggered a transfer of support of the application from the application context to the shadow application context.

In some aspects, a UE for wireless communication may include memory, one or more processors coupled to the memory and instructions stored in the memory. The instructions in the memory may be operable, when executed by the one or more processors, to cause the UE to determine, by an edge enabler client of the UE, to relocate an application context that supports an application on the UE that is served by an edge network device, and cause, by the edge enabler client, relocation of the application context.

In some aspects, an edge network device for wireless communication may include memory and instructions stored in the memory. The instructions in the memory may be operable, when executed by the one or more processors, to cause the edge network device to generate a new application context on the edge network device to support an application on a UE, based at least in part on receiving an indication that an edge enabler client of the UE has triggered relocation of an application context on the UE that supports the application, and support the application with the new application context.

In some aspects, an edge network device for wireless communication may include memory, one or more processors operatively coupled to the memory, and instructions stored in the memory. The instructions in the memory may be operable, when executed by the one or more processors, to cause the edge network device to receive an indication that an edge enabler client of a UE is triggering relocation of an application context, on the edge network device, that supports an application on the UE, and discontinue support of the application with the application context based at least in part on receiving an indication that the UE has generated a new application context to support the application.

In some aspects, a non-transitory computer-readable medium stores one or more instructions for wireless communication that, when executed by one or more processors of a UE, cause the UE to trigger, by an edge enabler client of the UE, generation of a shadow application context to support an application that is associated with an application context and that is served by an edge network device, and cause, by the edge enabler client, support of the application to be transferred from the application context to the shadow application context based at least in part on the generation of the shadow application context.

In some aspects, a non-transitory computer-readable medium stores one or more instructions for wireless communication that, when executed by one or more processors of an edge network device, cause the edge network device to generate a shadow application context on the edge network device for an application supported by an application context on a UE, based at least in part on receiving an indication that an edge enabler client of the UE has triggered generation of the shadow application context, maintain the shadow application context, and support the application with the shadow application context based at least in part on receiving an indication that the edge enabler client of the UE has triggered a transfer of support of the application from the application context to the shadow application context.

In some aspects, a non-transitory computer-readable medium stores one or more instructions for wireless communication that, when executed by one or more processors of an edge network device, cause the edge network device to transmit, to a UE, replication data of an application context that supports an application on the UE, based at least in part on receiving an indication that an edge enabler client of the UE is maintaining a shadow application context that is able to support the application, and discontinue support of the application with the application context based at least in part on receiving an indication that the edge enabler client of the UE has triggered a transfer of support of the application from the application context to the shadow application context.

In some aspects, a non-transitory computer-readable medium stores one or more instructions for wireless communication that, when executed by one or more processors of a UE, cause the UE to: determine, by an edge enabler client of the UE, to relocate an application context that supports an application on the UE that is served by an edge network device, and cause, by the edge enabler client, relocation of the application context.

In some aspects, a non-transitory computer-readable medium stores one or more instructions for wireless communication that, when executed by one or more processors of an edge network device, cause the edge network device to generate a new application context on the edge network device to support an application on a UE, based at least in part on receiving an indication that an edge enabler client of the UE has triggered relocation of an application context on the UE that supports the application, and support the application with the new application context.

In some aspects, a non-transitory computer-readable medium stores one or more instructions for wireless communication that, when executed by one or more processors of an edge network device, cause the edge network device to: receive an indication that an edge enabler client of a UE is triggering relocation of an application context, on the edge network device, that supports an application on the UE, and discontinue support of the application with the application context based at least in part on receiving an indication that the UE has generated a new application context to support the application.

In some aspects, an apparatus for wireless communication may include means for triggering, by an edge enabler client of the apparatus, generation of a shadow application context to support an application that is associated with an application context and that is served by an edge network device, and means for transferring, by the edge enabler client, support of the application from the application context to the shadow application context based at least in part on the generation of the shadow application context.

In some aspects, an apparatus for wireless communication may include means for generating a shadow application context on the apparatus for an application supported by an application context on a UE, based at least in part on receiving an indication that an edge enabler client of the UE has triggered generation of the shadow application context, means for maintaining the shadow application context, and means for supporting the application with the shadow application context based at least in part on receiving an indication that the edge enabler client of the UE has triggered a transfer of support of the application from the application context to the shadow application context.

In some aspects, an apparatus for wireless communication may include means for transmitting, to a UE, replication data of an application context that supports an application on the UE, based at least in part on receiving an indication that an edge enabler client of the UE is maintaining a shadow application context that is able to support the application, and means for discontinuing support of the application with the application context based at least in part on receiving an indication that the edge enabler client of the UE has triggered a transfer of support of the application from the application context to the shadow application context.

In some aspects, an apparatus for wireless communication may include means for determining, by an edge enabler client of the apparatus, to relocate an application context that supports an application on the apparatus that is served by an edge network device, and means for causing, by the edge enabler client, relocation of the application context.

In some aspects, an apparatus for wireless communication may include means for generating a new application context on the apparatus to support an application on a UE, based at least in part on receiving an indication that an edge enabler client of the UE has triggered relocation of an application context on the UE that supports the application, and means for supporting the application with the new application context.

In some aspects, an apparatus for wireless communication may include means for receiving an indication that an edge enabler client of a UE is triggering relocation of an application context, on the apparatus, that supports an application on the UE, and means for discontinuing support of the application with the application context based at least in part on receiving an indication that the UE has generated a new application context to support the application.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
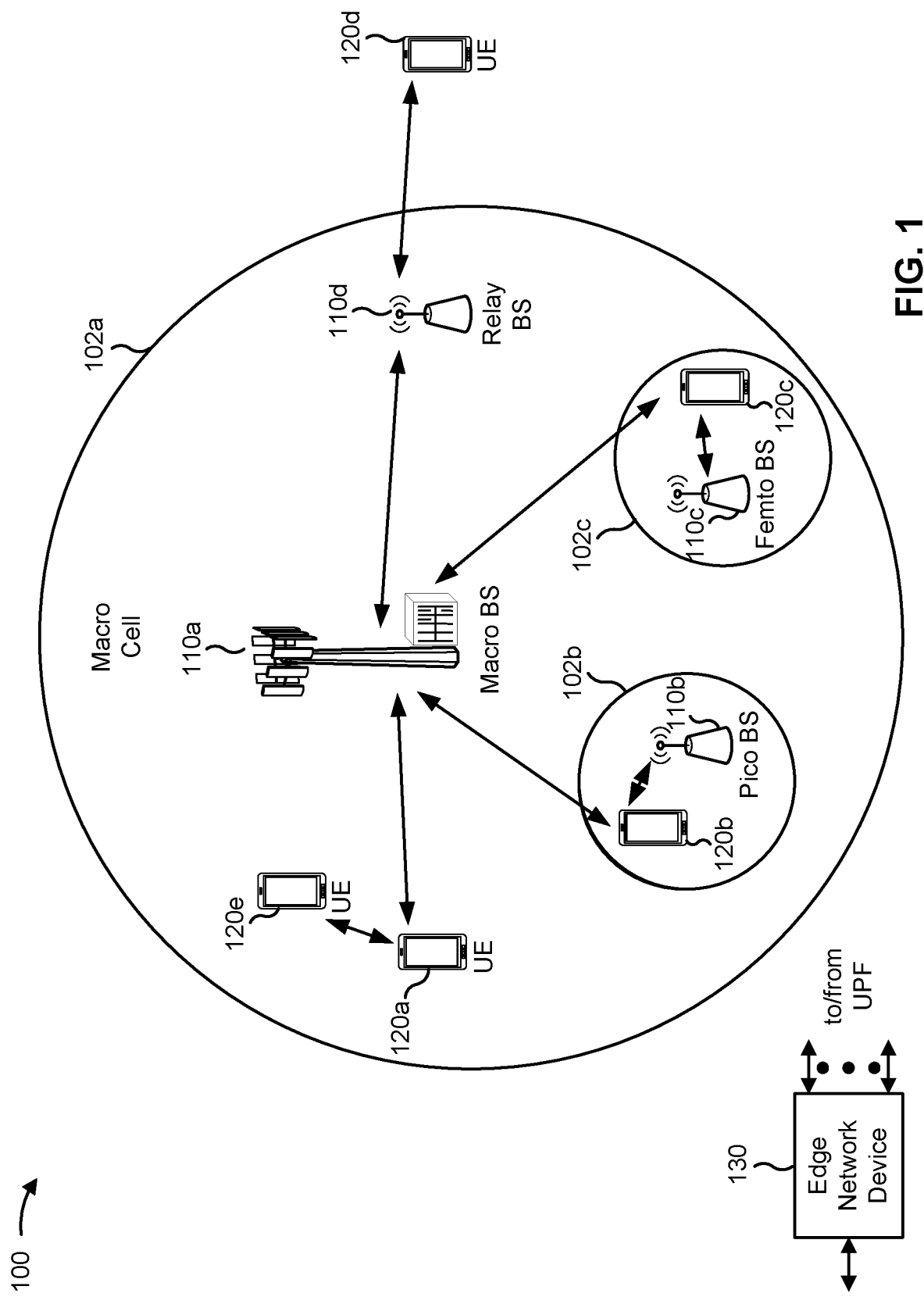
FIG. 1 is a diagram illustrating an example of a wireless communication network, in accordance with the present disclosure.

Edge computing brings network devices closer to a user equipment (UE) in order to supplement the UE's capabilities and to enhance user services. Edge network devices may offload processing of a UE and help the UE to conserve power and to multi-task. That is, computations that would be performed by the UE may be performed by an edge network device. When a UE is using an application, an application context is created in a location (point of compute) associated with processing the application. The point of compute may be in an edge network device, in a cloud computing network, or on the UE. When an application changes the point of compute, the application context may need to be transferred.

While an application context may be transferred from one edge network device to another edge network device, or from one location in a cloud computing network to another location in the cloud computing network, there is no process for transferring the application context from an edge network device to a UE or from the UE to the edge network device.

According to various aspects described herein, an application context may be transferred between an edge network device and a UE. The UE may have an edge enabler client that determines to trigger relocation of the application context. For example, the UE may determine that transactions with an edge enabler server of the edge network device have degraded, the edge enabler server has become inaccessible, or the UE has moved outside a service area of the edge enabler server. The UE may determine, by an edge enabler client, to relocate an application context on the edge network device to the UE, and later relocate the application context from the UE to the edge network device.

Relocation of an application context may potentially cause a loss of some application data, including a present state of the application. In some aspects, the UE may determine, by the edge enabler client, to maintain a copy (shadow) application context for an application (including a present state of the application) so that the UE may switch a location of the application context between the UE and the edge network device due to offloading, traffic, and/or capability issues.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller may couple to a set of BSs and may provide coordination and control for these BSs. Network controller may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, UE 120 may communicate with an edge network device 130 of an edge network. Edge network device 130 may offload processing of UE 120 and help UE 120 to conserve power and perform other functions. UE 120 may communicate with edge network device 130 via BS 110 and a user plane function (UPF). Edge network device 130 may communicate with a core network or a cloud computing network.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using P2P communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
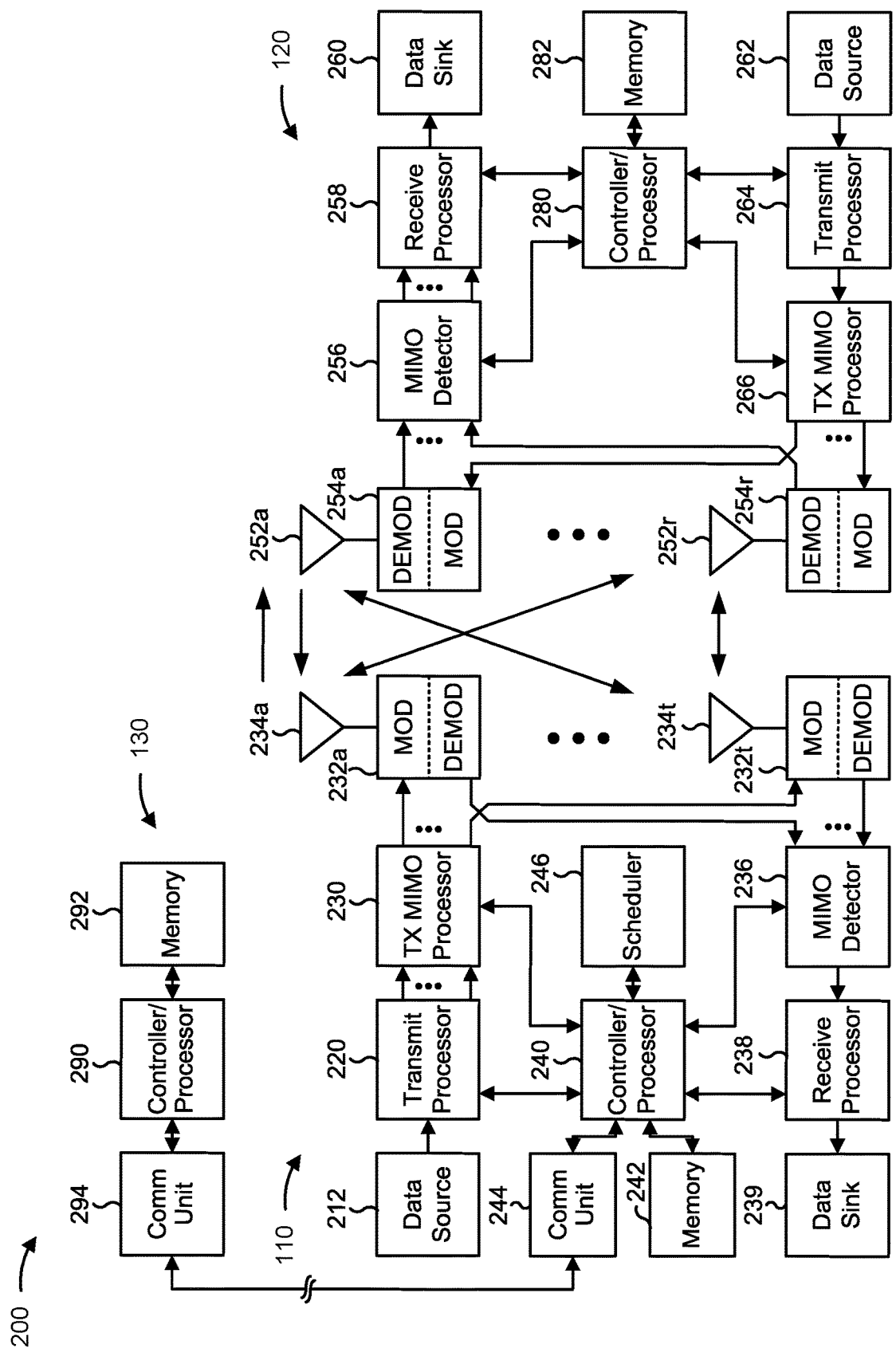
FIG. 2 is a diagram illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate with edge network device 130 via communication unit 244. Edge network device 130 may include a communication unit 294, a controller/processor 290, and a memory 292.

Controller/processor 240 of base station 110, controller/processor 280 of UE 120, controller/processor 290 of edge network device 130, and/or any other component(s) of FIG. 2 may perform one or more techniques associated with edge application context relocation and/or replication, as described in more detail elsewhere herein. For example, controller/processor 240 of base station 110, controller/processor 280 of UE 120, controller/processor 290 of edge network device 130, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. Memories 242, 282, and 292 may store data and program codes for base station 110, UE 120, and edge network device 130, respectively. A scheduler 246 may schedule UEs for data transmission on the downlink and/or uplink.

Figure 9:
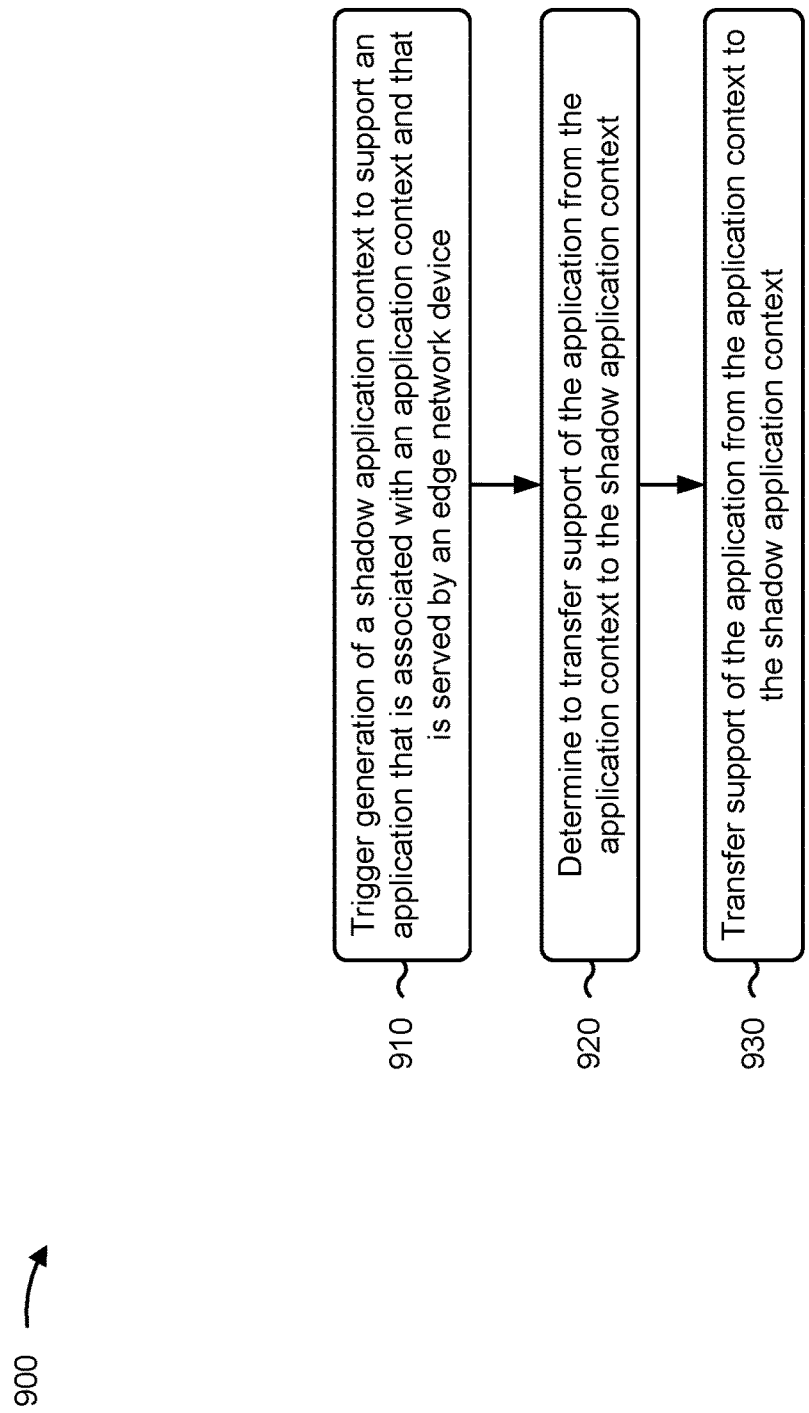
FIG. 9 is a diagram illustrating an example process performed, for example, by a UE, in accordance with the present disclosure.
Figure 11:
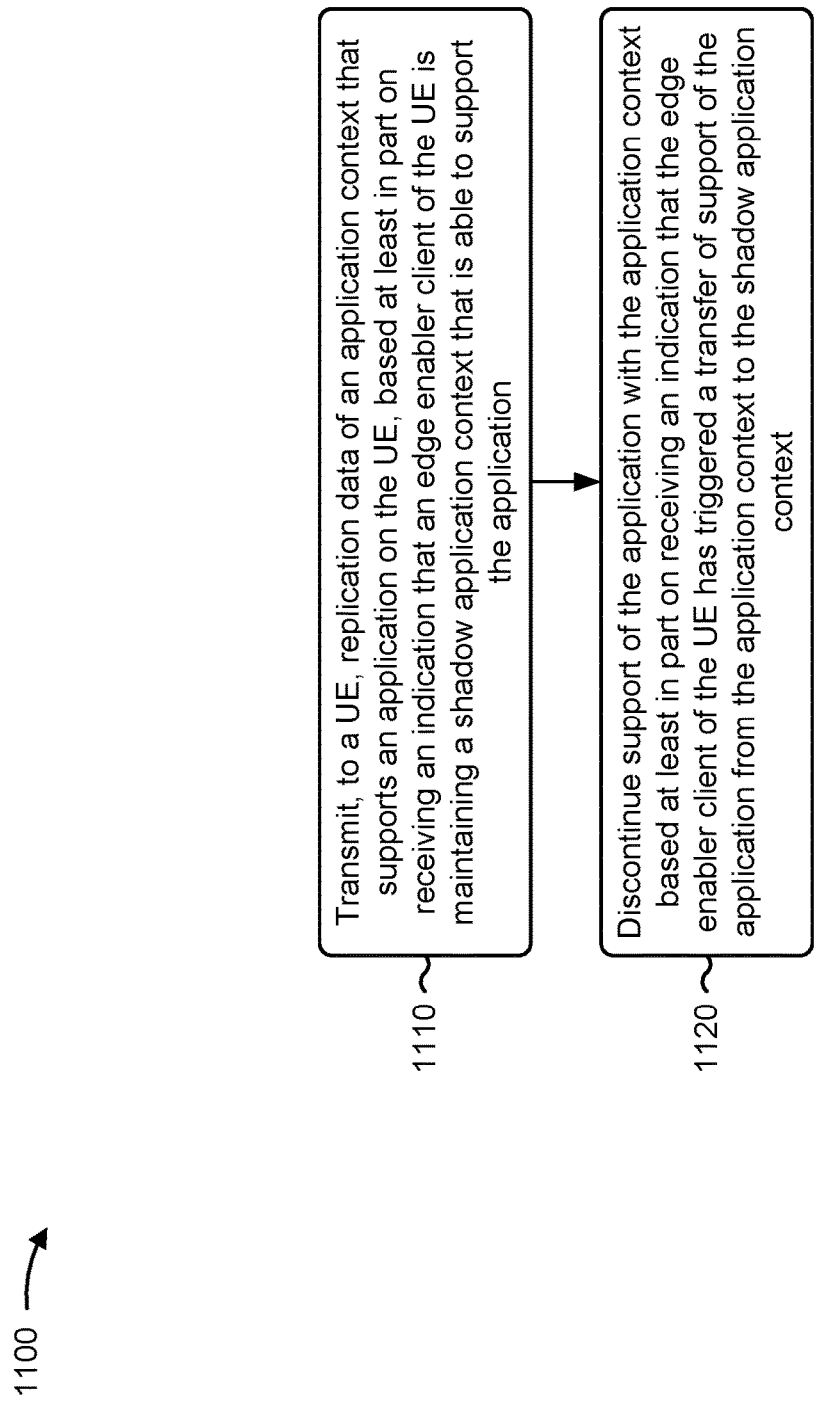
FIG. 11 is a diagram illustrating an example process performed, for example, by an edge network device, in accordance with the present disclosure.
Figure 12:
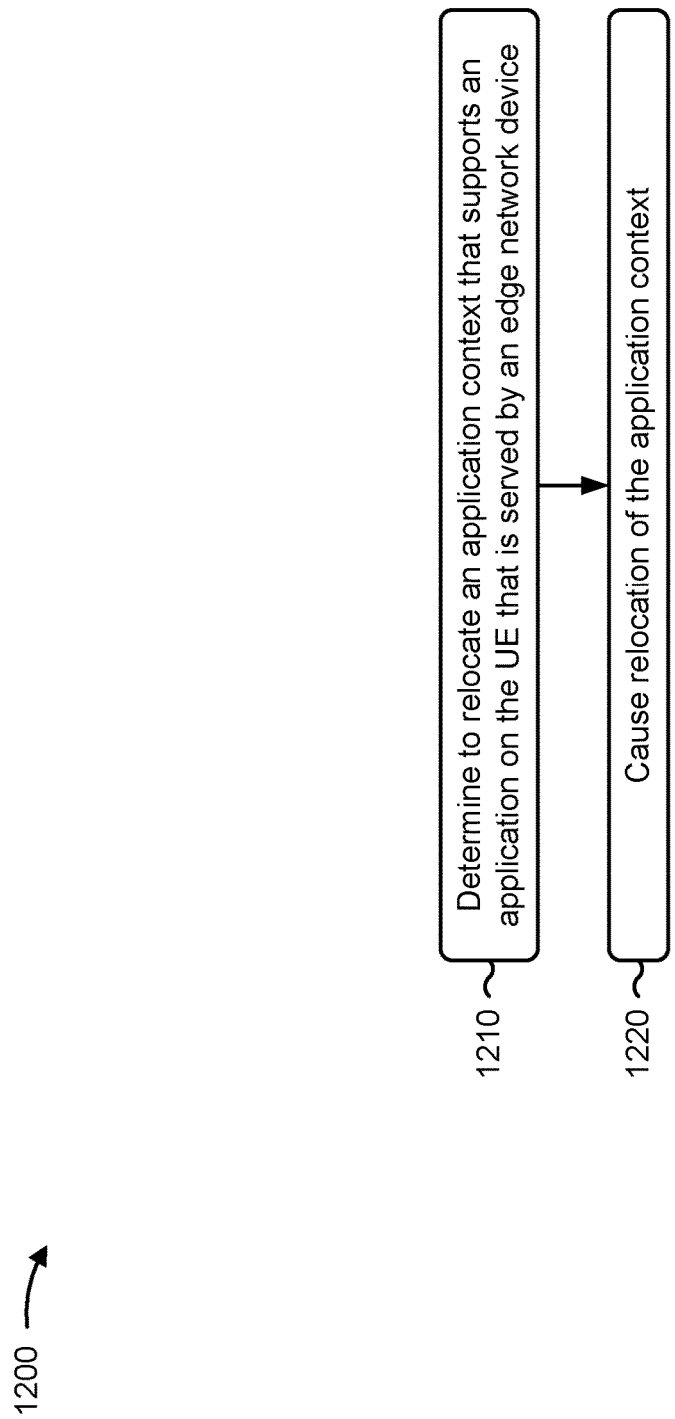
FIG. 12 is a diagram illustrating an example process performed, for example, by a UE, in accordance with the present disclosure.

The stored program codes, when executed by processor 280 and/or other processors and modules at UE 120, may cause UE 120 to perform operations described with respect to process 900 of FIG. 9, process 1200 of FIG. 12, and/or other processes as described herein. The stored program codes, when executed by processor 240 and/or other processors and modules at edge network device 130, may cause edge network device 130 to perform operations described with respect to process 1000 of FIG. 10, process 1100 of FIG. 11, process 1300 of FIG. 13, process 1400 of FIG. 14, and/or other processes as described herein.

In some aspects, UE 120 may include means for triggering, by an edge enabler client of UE 120, generation of a shadow application context to support an application that is associated with an application context and that is served by an edge network device, and/or means for transferring, by the edge enabler client, support of the application from the application context to the shadow application context based at least in part on the generation of the shadow application context. In some aspects, such means may include one or more components of UE 120 described in connection with FIG. 2.

In some aspects, edge network device 130 may include means for generating a shadow application context on edge network device 130 for an application supported by an application context on a UE, based at least in part on receiving an indication that an edge enabler client of the UE has triggered generation of the shadow application context, means for maintaining the shadow application context, and/or means for supporting the application with the shadow application context based at least in part on receiving an indication that the edge enabler client of the UE has triggered a transfer of support of the application from the application context to the shadow application context. In some aspects, such means may include one or more components of edge network device 130 described in connection with FIG. 2.

In some aspects, edge network device 130 may include means for transmitting, to a UE, replication data of an application context that supports an application on the UE, based at least in part on receiving an indication that an edge enabler client of the UE is maintaining a shadow application context that is able to support the application, and/or means for discontinuing support of the application with the application context based at least in part on receiving an indication that the edge enabler client of the UE has triggered a transfer of support of the application from the application context to the shadow application context. In some aspects, such means may include one or more components of edge network device 130 described in connection with FIG. 2.

In some aspects, UE 120 may include means for determining, by an edge enabler client of UE 120, to relocate an application context that supports an application on UE 120 that is served by an edge network device, and/or means for causing, by the edge enabler client, relocation of the application context. In some aspects, such means may include one or more components of UE 120 described in connection with FIG. 2.

In some aspects, edge network device 130 may include means for generating a new application context on edge network device 130 to support an application on a UE, based at least in part on receiving an indication that an edge enabler client of the UE has triggered relocation of an application context on the UE that supports the application, and/or means for supporting the application with the new application context. In some aspects, such means may include one or more components of edge network device 130 described in connection with FIG. 2.

In some aspects, edge network device 130 may include means for receiving an indication that an edge enabler client of a UE is triggering relocation of an application context, on edge network device 130, that supports an application on the UE, and/or means for discontinuing support of the application with the application context based at least in part on receiving an indication that the UE has generated a new application context to support the application. In some aspects, such means may include one or more components of edge network device 130 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
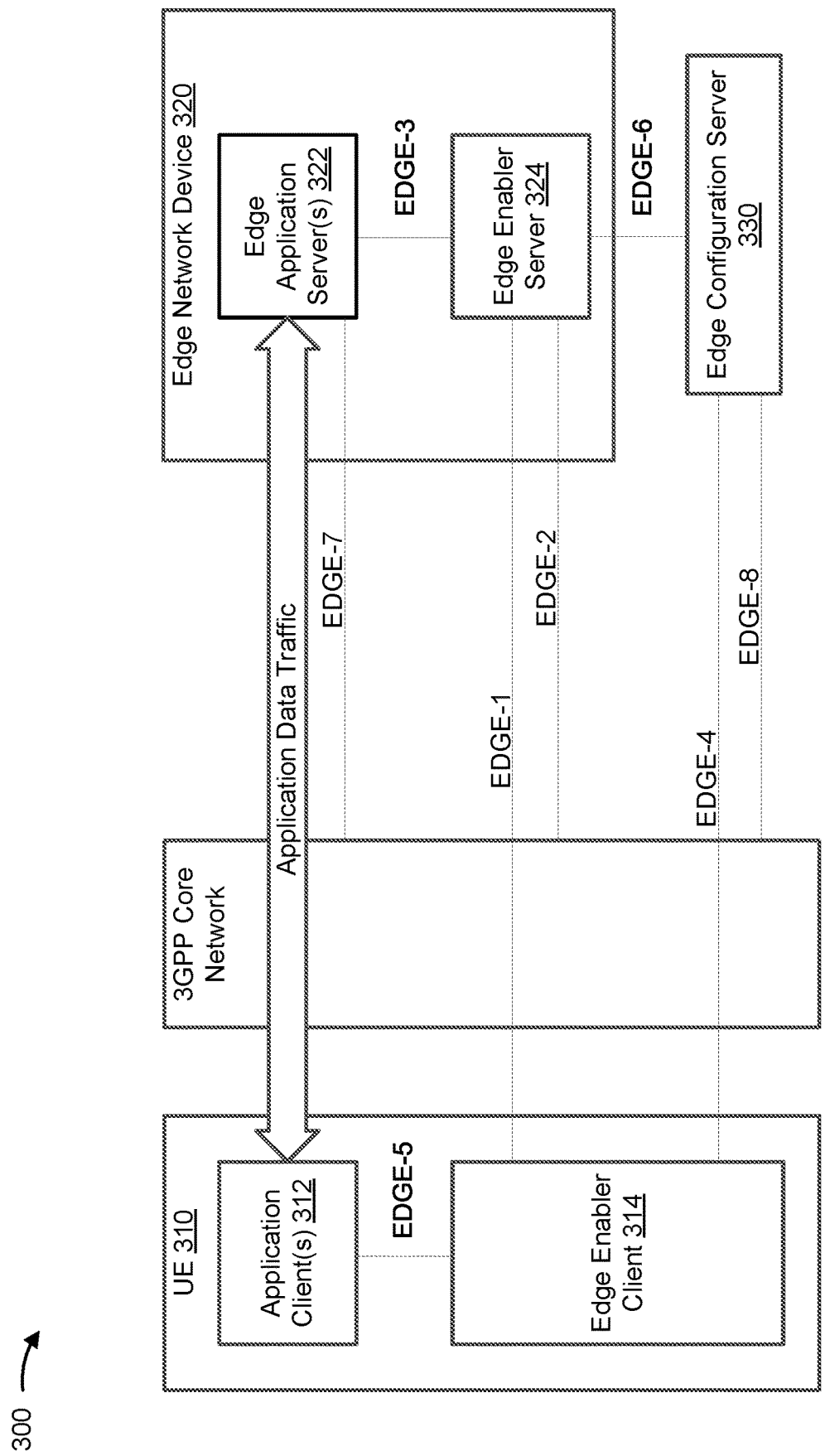
FIG. 3 is a diagram illustrating an example of edge computing, in accordance with the present disclosure.

FIG. 3 is a diagram illustrating an example 300 of edge computing, in accordance with the present disclosure. FIG. 3 shows a UE 310 (e.g., UE 120) with an (edge) application client 312 that shares application data traffic with an edge application server 322 of an edge network device 320 (e.g., edge network device 130) in an edge data network. FIG. 3 also shows an edge enabler client 314 of the UE that communicates with an edge enabler server 324 of the edge network device 320. Components of the UE 310 and the edge network device 320 may communicate via edge messages.

Edge computing brings network devices closer to a UE in order to supplement the UE's capabilities and to enhance user services. Edge network devices, such as edge network device 320, may offload processing of UE 310 and help UE 310 to conserve power and to multi-task.

When UE 310 is using an application, an application context is created where processing for the application occurs (point of compute), and the point of compute may be in edge network device 320 or on UE 310. More specifically, the application context connected to the application may reside on edge application server 322 of edge network device 320 or on edge application client 312 of UE 310. Edge application client 312 on UE 310 may execute the application that is associated with or supported by the application context. The application context may include application data and may include a present state of the application. For example, a user playing an online game may not want to lose a current state of the game, which may include a status of an avatar of the user, a location of the avatar, an inventory of the avatar, and/or an ability of the avatar. If such characteristics of the avatar are not maintained during a mobility event of UE 310 or during a change in traffic conditions, the user may experience game presentation errors, or the application may fail altogether. If the application is a serving a business, the application may affect production or customer relations for the company.

Edge enabler server 324 of edge network device 320 may handle operations of edge application server 322, including making decisions to set up and take down edge application server 322, and perform other custodial functions. Edge enabler server 324 may communicate with an edge configuration server 330, which may configure edge enabler server 324 and edge enabler client 314. When an application changes a point of compute, the application context may need to be transferred to another edge enabler server. Edge enabler server 324 may thus determine whether an application context needs to be relocated to another edge enabler server.

While an application context may be transferred from one edge network device to another edge network device, or from one location in a cloud computing network to another location in the cloud computing network, there is no process for transferring the application context from an edge network device to a UE, or from the UE to the edge network device.

According to various aspects described herein, an application context may be transferred between an edge network device and a UE. For example, UE 310 may have edge enabler client 314 determine to trigger relocation of the application context. For example, UE 310 may determine that transactions with edge enabler server 324 of edge network device 320 have degraded, edge enabler server 324 has become inaccessible, or UE 310 has moved outside a service area of edge enabler server 324. UE 310 may determine, by edge enabler client 314, to relocate an application context on edge network device 320 to UE 310, and may subsequently relocate the application context from edge network device 320 to UE 310.

Relocation of an application context may potentially cause some loss of application data, including a state of the application. In some aspects, UE 310 may determine, by edge enabler client 314, to maintain a copy (shadow) application context for an application (including a state of the application) so that UE 310 may switch a location of the application context between UE 310 and edge network device 320 due to offloading, traffic, and/or capability issues. As a result, services for the application are not degraded when conditions change or when the application context is transferred. This may cause UE 310 and edge network device 320 to conserve processing resources and signaling resources.

As indicated above, FIG. 3 is provided as an example. Other examples may differ from what is described with respect to FIG. 3.

Figure 4:
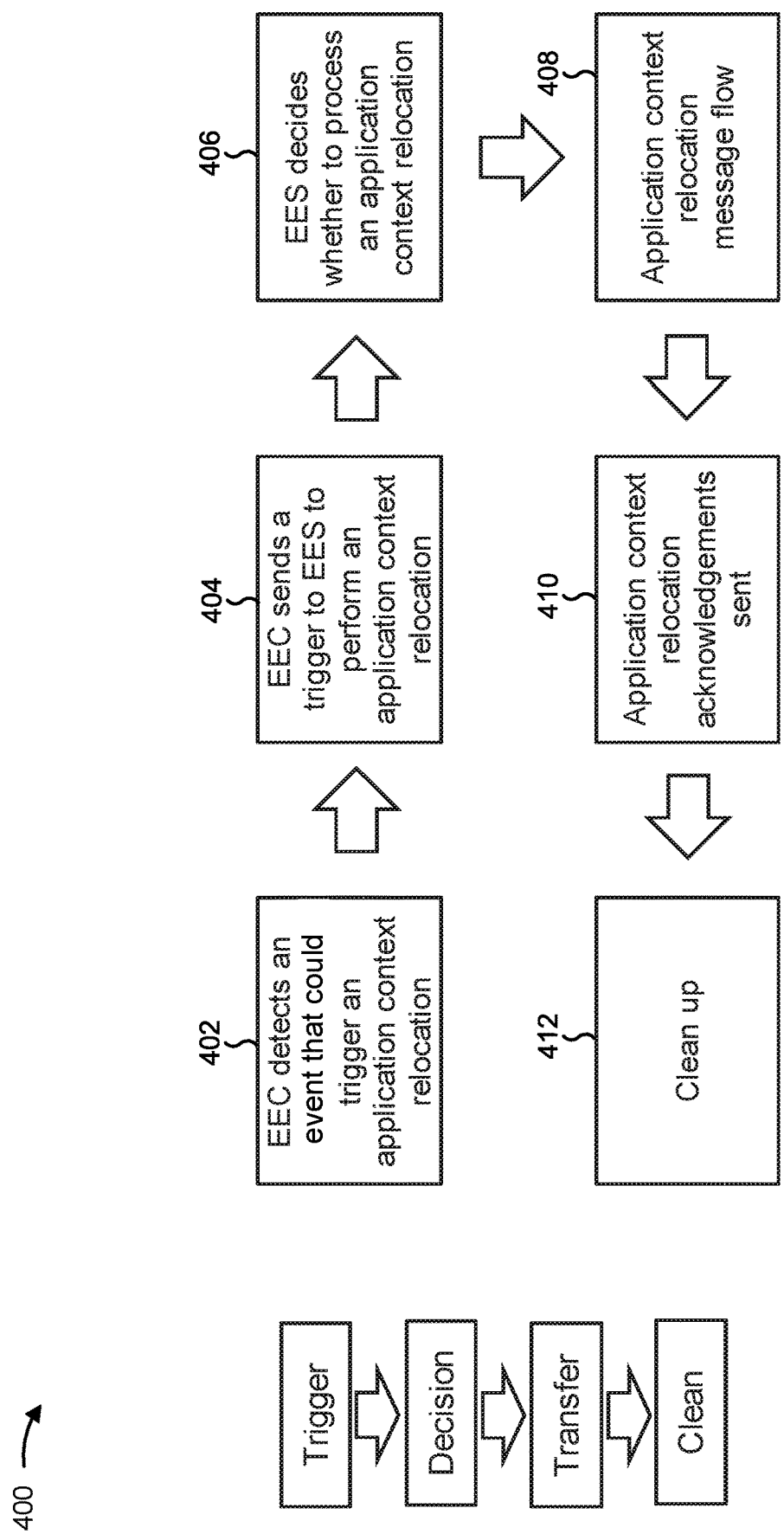
FIG. 4 is a diagram illustrating an example of an application context relocation flow for edge computing, in accordance with the present disclosure.

FIG. 4 is a diagram illustrating an example 400 of an application context relocation flow for edge computing, in accordance with the present disclosure.

As shown by FIG. 4 and by reference number 402, an edge enabler client (EEC) (or source EEC) of an edge network device may detect an event (e.g., handover) that could lead to a transfer of an application context. As shown by reference number 404, the EEC may trigger the edge enabler server (EES) to perform an application context relocation. In previous solutions, it was the EES (or source EES) that triggered an application context relocation. However, the EEC, being located on the UE, may have more information about conditions at the UE and the application executing on the UE. The EEC may also be able to make quicker decisions than the EES, because the EES is at the edge network device and has to wait for information from the UE. The EEC may obtain location details for a target EES and/or a target edge application server (EAS). The EEC may make a yes or no decision based at least in part on information in a trigger condition or a trigger indication.

As shown by reference number 406, the EES may decide whether to process the application context relocation (and honor the trigger from the EEC). If the EES determines to go forward with the application context relocation, the EES and the EEC may signal each other to coordinate the application context relocation from the UE to the edge network device or from the edge network device to the UE, as shown by reference number 408. As shown by reference number 410, the EES and the EEC may transmit relocation acknowledgements, and as shown by reference number 412, perform any clean up procedures (e.g., clean up local cache).

As indicated above, FIG. 4 is provided as an example. Other examples may differ from what is described with respect to FIG. 4.

Figure 5:
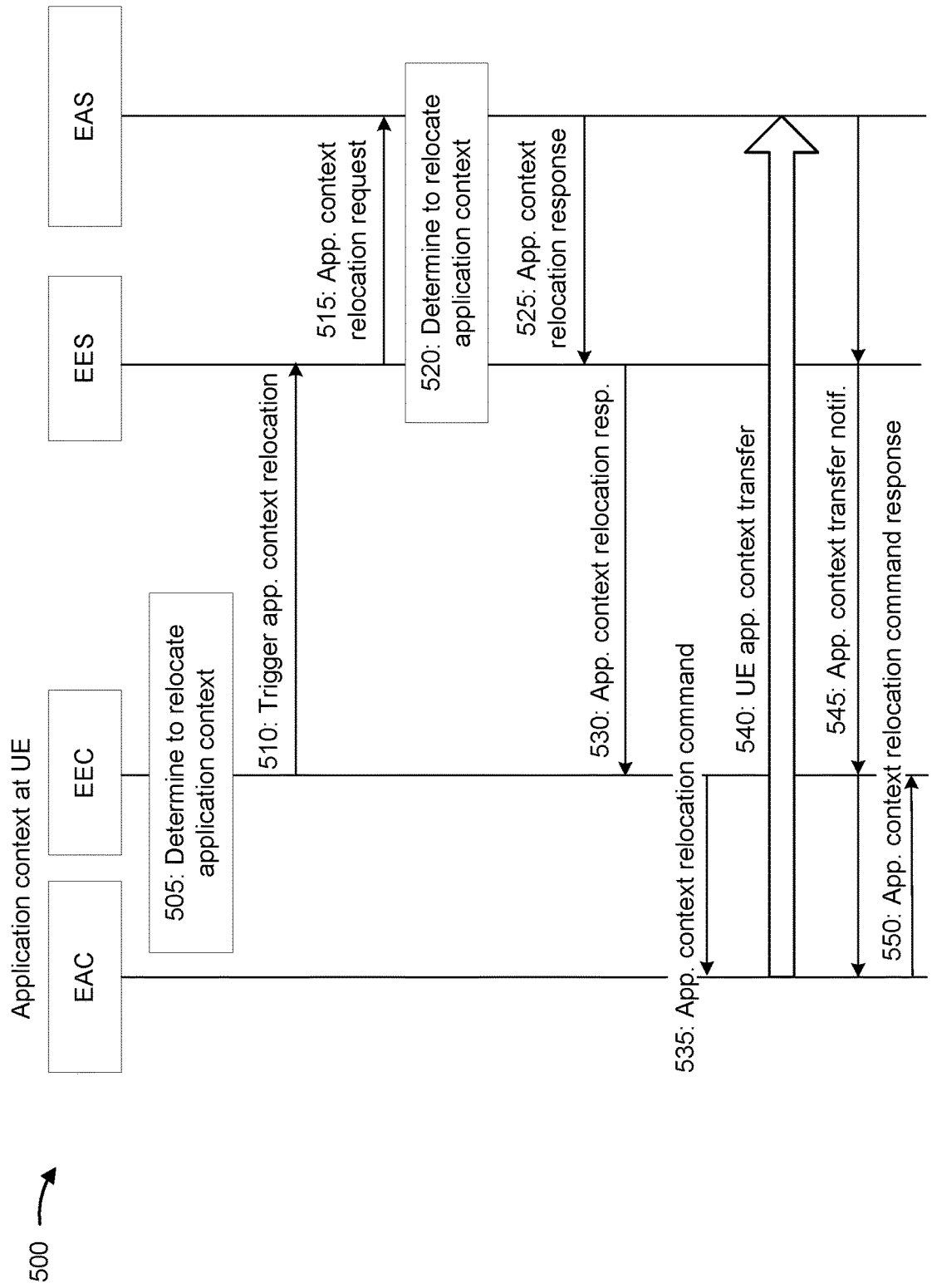
FIG. 5 is a diagram illustrating an example of edge application context relocation, in accordance with the present disclosure.

FIG. 5 is a diagram illustrating an example 500 of edge application context relocation, in accordance with the present disclosure. FIG. 5 shows signaling between an EEC of a UE, an edge application client (EAC) of the UE, an EES of an edge network device, and an EAS of the edge network device.

In some aspects, an application context that supports an application may reside on the UE. As shown by reference number 505, the EEC may determine to relocate the application context from the UE to the edge network device. For example, the EEC may determine that the EAS may be more suitable for the application context because the UE is moving outside of a service area or there are other conditions that are degrading application context support for the application on the UE (e.g., processing of the application context may be straining a processing capability of the UE). As shown by reference number 510, the EEC may transmit a relocation trigger message to the EES.

As shown by reference number 515, the EES may transmit a relocation request to the EAS. As shown by reference number 520, the EES and/or the EAS may determine whether to honor the trigger from the EEC. In some aspects, the EAS may have information about a UE capability for handling the application context (e.g., the UE is moving away, the EAS is too busy) and may deny the trigger based at least in part on the information. As shown by reference number 525, the EAS may respond that the request to relocate the application context from the UE to the edge network device is granted. As shown by reference number 530, the EES may respond to the EEC indicating that relocation of the application context to the edge network device can go forward.

The EEC may provide a command to the EAC, at reference number 535, to transfer the application context. As shown by reference number 540, the EAC may transfer the application context to the EAS. The EAS may respond at reference number 545. At this point, the EAC may disconnect the application context at the UE to the application and transmit a response message to the EEC, as shown by reference number 550.

As indicated above, FIG. 5 is provided as an example. Other examples may differ from what is described with respect to FIG. 5.

Figure 6:
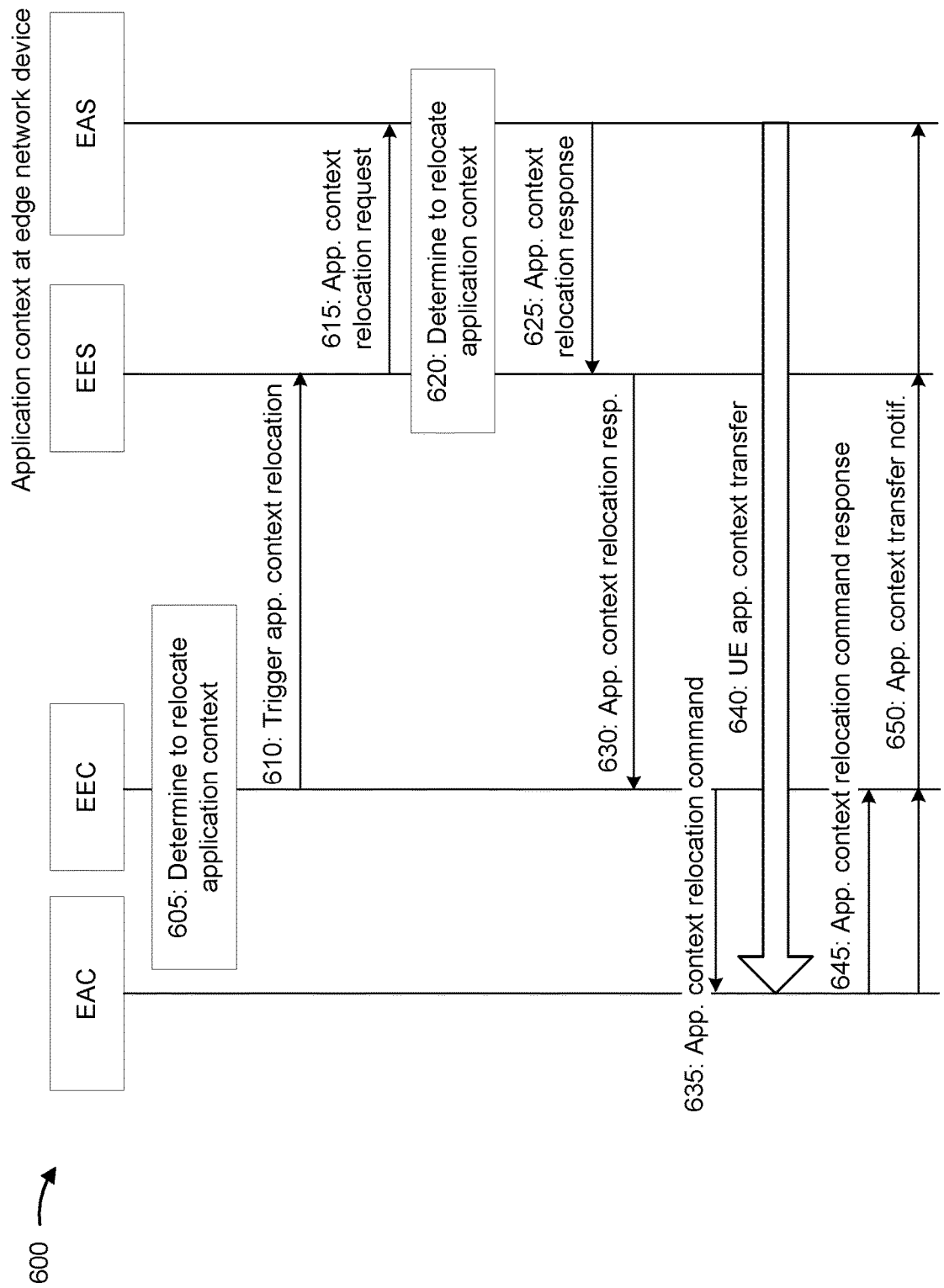
FIG. 6 is a diagram illustrating an example of edge application context relocation, in accordance with the present disclosure.

FIG. 6 is a diagram illustrating an example 600 of edge application context relocation, in accordance with the present disclosure. FIG. 6 shows signaling between an EEC of a UE, an EAC of the UE, an EES of an edge network device, and an EAS of the edge network device.

In some aspects, an application context that supports an application may reside on the edge network device. As shown by reference number 605, the EEC of the UE may determine to relocate the application context from the edge network device to the UE. For example, the EEC may determine that the EAC may be more suitable for the application context because the UE is moving outside of a service area. As shown by reference number 610, the EEC may transmit a relocation trigger message to the EES.

As shown by reference number 615, the EES may transmit a relocation request to the EAS. As shown by reference number 620, the EES and/or the EAS may determine whether to honor the trigger from the EEC. In some aspects, the EAS may have information about a UE capability to handle the application context (e.g., the UE is moving away, the UE is not as capable) and may deny the trigger based at least in part on the information. As shown by reference number 625, the EAS may respond that the request to relocate the application context from the UE to the edge network device is granted. As shown by reference number 630, the EES may respond to the EEC indicating that relocation of the application context to the edge network device can take place.

The EEC may provide a command, at reference number 635, to the EAC to prepare to receive the application context. As shown by reference number 640, the EAC may receive the application context. The EAS and the EES may respond at reference number 645. At this point, the EAC may begin maintaining the application context at the UE to the application and transmit a response message to the EEC at reference number 650.

As indicated above, FIG. 6 is provided as an example. Other examples may differ from what is described with respect to FIG. 6.

Figure 7:
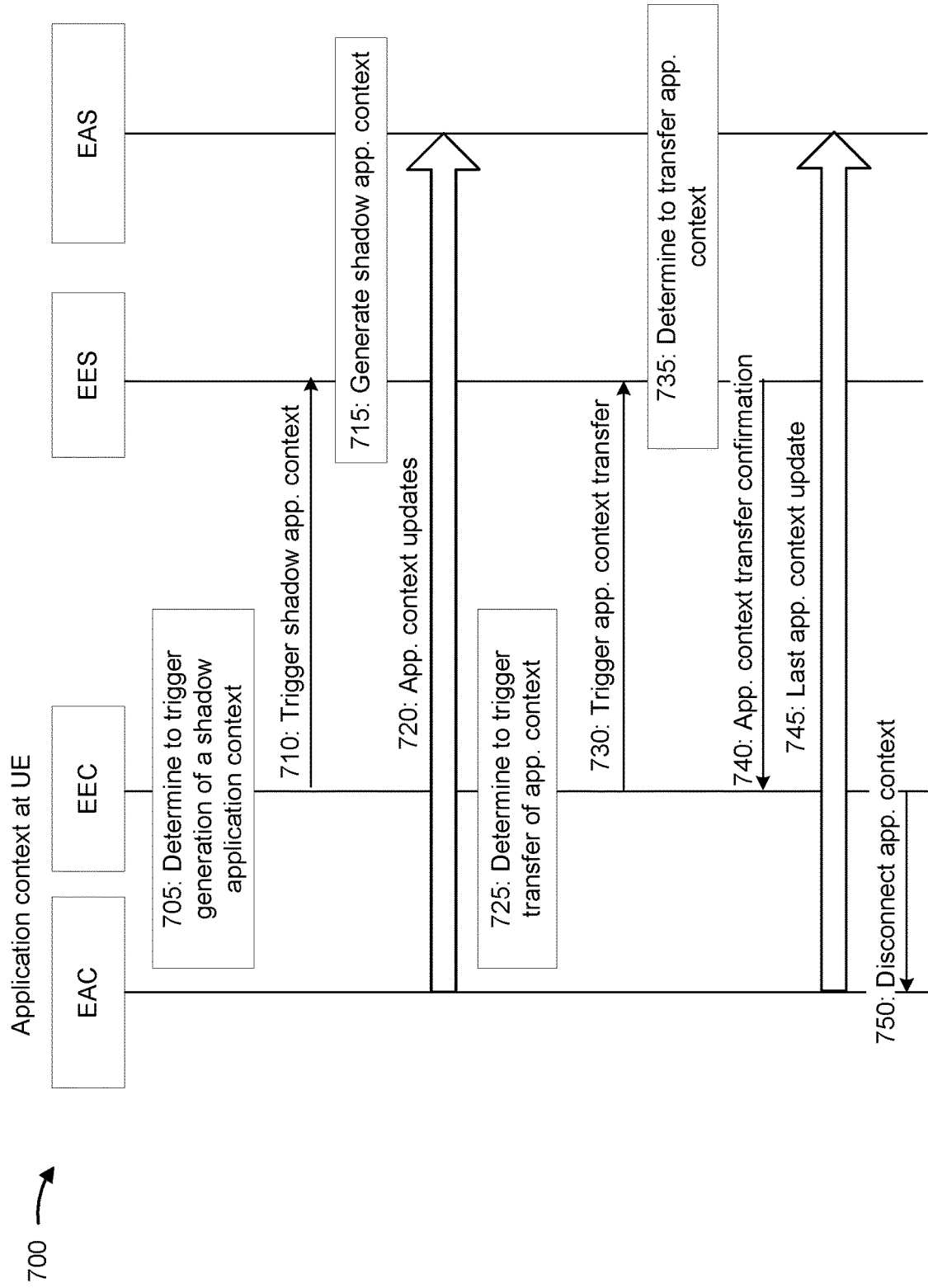
FIG. 7 is a diagram illustrating an example of edge application context replication, in accordance with the present disclosure.

FIG. 7 is a diagram illustrating an example 700 of edge application context replication, in accordance with the present disclosure. FIG. 7 shows signaling between an EEC of a UE, an EAC of the UE, an EES of an edge network device, and an EAS of the edge network device.

In some aspects, an application context that supports an application may reside on the UE. As shown by reference number 705, the EEC may determine to trigger generation of a live replication of the application context. The live replication may be referred to as a shadow application context. The shadow application context may operate like a regular application context on the EAS (or as the EAS), except that the shadow application context is not connected to the application. The shadow application context may reach the same state as the application context for a particular session, and may even establish a shadow connection to cloud servers and/or resources that are used by the application. For example, the EAS may execute a game engine that connects to a multi-player game in a special shadow mode or other mode (e.g., via proxying, anycast internet protocol address, network address translation). In this example, the shadow application context may maintain current player actions, a current video encoder status, and/or synchronization information.

The EEC may determine that the UE is being handed over or that there are other reasons that the UE may need to quickly relocate the application context without a noticeable drop in performance or loss of a state of the application supported by the application context. If there is a loss of connectivity, or if performance with the application context does not satisfy a performance threshold, the EEC may determine to connect the application to the shadow application context.

The EAC may not be aware of whether the EEC has allocated execution to the local hardware or to network resources. In some aspects, to help the EEC make a decision to trigger generation the shadow application context, the EAC may provide the EEC with information on a required maximum latency for completing the process. For example, if an application context transfer with a shadow application will take too long (e.g., not satisfy a timing threshold), the EEC may determine to not proceed with triggering generation of a shadow application context or to relocate to the shadow application context. The EEC may also continuously monitor network and local resources and their availability in order to make any decisions. As shown by reference number 710, the EEC may transmit a trigger message, to the EES, to trigger generation of the shadow application context.

In some embodiments, the EEC may determine to trigger generation of the shadow application context based at least in part on a quantity of users using the application. For example, a transfer of the application context may be restricted to a single user experience, such that application context transitioning between a UE and an edge network device may be beneficial. For multi-user experiences, the full context may be better suited for maintenance by the network.

The EES and/or the EAS may determine whether to honor the trigger from the EEC. As shown by reference number 715, the EES may generate the shadow application context. For example, the EES may receive information about the application context or a copy of the application context (e.g., from the EAC). In some aspects, the EAS may maintain the shadow application context by receiving updates, as shown by reference number 720.

As shown in example 700, and as shown by reference number 725, the EEC may determine to relocate the application context from the UE to the edge network device. As shown by reference number 730, the EEC may transmit a context transfer message to the EES, indicating that relocation of the application context to the edge network device can occur. As shown by reference number 735, the EES and/or the EAS may determine to honor the transfer message and transfer the application context from the UE (EAS) to the edge network device (EAS). The EES may provide a confirmation message to the EEC at reference number 740.

In some aspects, the EAC may transmit a last, fresh update to the shadow application context at reference number 745 before disconnecting the application context from the application at step 750. It is now up to the EAS of the edge network device to maintain the shadow application context that has become the new application context.

As indicated above, FIG. 7 is provided as an example. Other examples may differ from what is described with respect to FIG. 7

Figure 8:
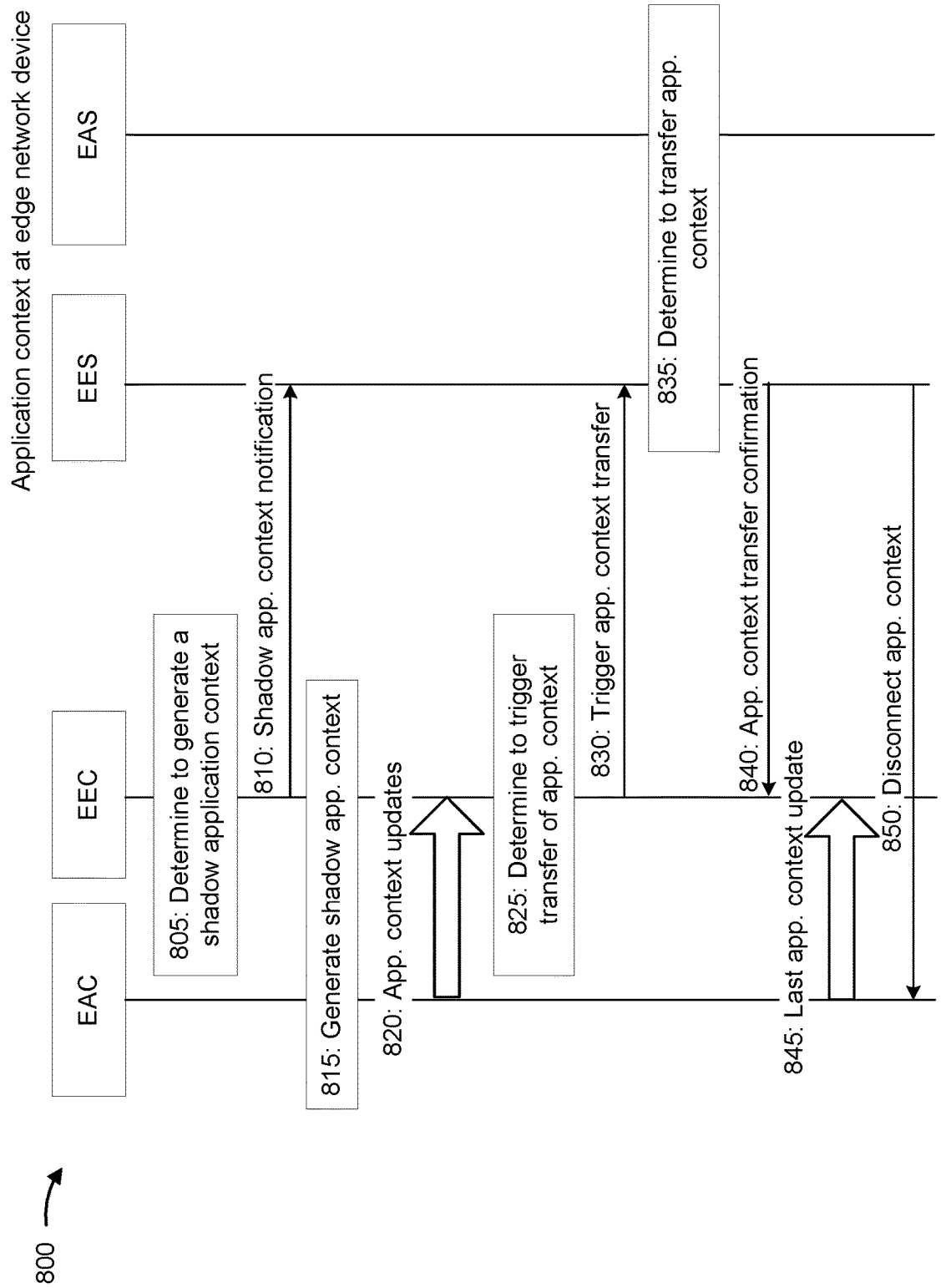
FIG. 8 is a diagram illustrating an example of edge application context replication, in accordance with the present disclosure.

FIG. 8 is a diagram illustrating an example 800 of edge application context replication, in accordance with the present disclosure. FIG. 8 shows signaling between an EEC of a UE, an EAC of the UE, an EES of an edge network device, and an EAS of the edge network device.

In some aspects, an application context that supports an application may reside on the edge network device. As shown by reference number 805, the EEC may determine to trigger generation of a shadow application context. For example, the EEC may detect that the UE is about to leave a service area of the EAS, and the EEC cannot discover another appropriate EAS to host an application context. The EEC may thus determine that the application context has to fall back to on-board processing on the UE.

As shown by reference number 810, the EEC may transmit a notification to the EES that the UE will generate a shadow application context. As shown by reference number 815, the EEC and/or the EAS may generate the shadow application context. The EEC may maintain the shadow application context by receiving and processing updates for the application from the EAC, as shown by reference number 820.

As shown in example 800, as shown by reference number 825, the EEC may determine to relocate the application context from the edge network device to the UE. As shown by reference number 830, the EEC may transmit a context transfer message to the EES indicating that relocation of the application context to the shadow application context at the UE is to take place. As shown by reference number 835, the EES and/or the EAS may determine to honor the transfer message and transfer application context support from the edge network device (EAS) to the UE (EAS). The EES may provide a confirmation message to the EEC, as shown by reference number 840.

In some aspects, the EAC may transmit a last (fresh) update to the shadow application context at reference number 845 before the EEC connects the shadow application context to the application. As shown by reference number 850, the EES may now disconnect the application context at the EES from the application. It is now up to the EAC of the UE to maintain the shadow application context that has become the new application context.

In some aspects, when the UE transfers the application context to the EAS, the quality may be lower due to a handover, the UE having less capabilities, a traffic load, latency, losses, and/or the like. In some aspects, the quality of the service may be higher because the UE can provide a higher quality of service, although with increased power consumption. In either scenario, the UE and/or the edge network device may match a performance of the shadow application context with a performance of the application context before the transfer. For example, if the performance has greatly improved or will improve after the transfer, the EEC and/or the EAC may temper a large jump in performance so as not to use more processing resources than necessary without alerting the user to the change in performance. The EEC and/or the EAC may also boost or raise performance parameters for the shadow application context comparable to the application context if the application context had a high quality of service. In other words, the performance before switching to the shadow application context and the performance after switching to the shadow application context does not need to be a precise match. The performances may match if the EEC and/or the EAC adjusts the performance of the shadow application context after switching such that a difference between the performances is within a particular range of quality of service, parameters, and/or performance threshold.

As indicated above, FIG. 8 is provided as an example. Other examples may differ from what is described with respect to FIG. 8.

As a result of the aspects described in connection with FIGS. 4-8, the UE and/or the edge network device may enable flexible transitioning between on-device processing and edge processing. The EEC of the UE may select where to operate an application context to improve performance. In some aspects, the UE may enable split rendering for extended reality by flexibly splitting workload processing between an edge network and the UE.

FIG. 9 is a diagram illustrating an example process 900 performed, for example, by a UE, in accordance with the present disclosure. Example process 900 is an example where the UE (e.g., UE 120 depicted in FIGS. 1 and 2, UE 310 depicted in FIG. 3, an EEC and/or an EAC depicted in FIGS. 4-8) performs operations associated with edge application context relocation.

As shown in FIG. 9, in some aspects, process 900 may include triggering generation of a shadow application context to support an application that is associated with an application context and that is served by an edge network device (block 910). For example, the UE (e.g., using receive processor 258, transmit processor 264, controller/processor 280, memory 282) may trigger generation of a shadow application context to support an application that is associated with an application context and that is served by an edge network device, as described above. In some aspects, process 900 includes determining to trigger the generation of the shadow application context. For example, the UE (e.g., using receive processor 258, transmit processor 264, controller/processor 280, memory 282) may determine to trigger the generation of the shadow application context.

As further shown in FIG. 9, in some aspects, process 900 may include determining to transfer support of the application from the application context to the shadow application context (block 920). For example, the UE (e.g., using receive processor 258, transmit processor 264, controller/processor 280, memory 282) may determine to transfer support of the application from the application context to the shadow application context, as described above.

As further shown in FIG. 9, in some aspects, process 900 may include transferring support of the application from the application context to the shadow application context (block 930). For example, the UE (e.g., using receive processor 258, transmit processor 264, controller/processor 280, memory 282) may transfer support of the from the application context to the shadow application context, as described above. In some aspects, the transfer of support to the shadow application context may be based at least in part on the generation of the shadow application context. The generation of the shadow application context provides an ability to transfer support from the application context, but support may be transferred or may not be transferred to the shadow application context. In some aspects, the transfer of support to the shadow application context may be based at least in part on the determination to transfer support to the shadow application context.

Process 900 may include additional aspects, such as any single aspect or any combination of aspects described below and/or in connection with one or more other processes described elsewhere herein.

In a first aspect, the application context is on the UE and the shadow application context is on the edge network device.

In a second aspect, alone or in combination with the first aspect, transferring support of the application includes transmitting a last update of data for the shadow application context, connecting the application to the shadow application context, and disconnecting the application from the application context.

In a third aspect, alone or in combination with one or more of the first and second aspects, the application context is on the edge network device and the shadow application context is on the UE, and process 900 includes maintaining the shadow application context.

In a fourth aspect, alone or in combination with one or more of the first through third aspects, maintaining the shadow application context includes replicating the application context as the shadow application context such that the shadow application context is able to support a present state of the application.

In a fifth aspect, alone or in combination with one or more of the first through fourth aspects, transferring support of the application includes receiving a last update of data for the shadow application context, and connecting the application to the shadow application context.

In a sixth aspect, alone or in combination with one or more of the first through fifth aspects, the shadow application context includes a present state of the application.

In a seventh aspect, alone or in combination with one or more of the first through sixth aspects, determining to trigger generation of the shadow application context includes determining that a handover of the UE is triggered and that the handover is likely to degrade a quality of service of the application.

In an eighth aspect, alone or in combination with one or more of the first through seventh aspects, determining to trigger generation of the shadow application context includes determining to trigger generation of the shadow application context based at least in part on a quantity of users participating in the application.

In a ninth aspect, alone or in combination with one or more of the first through eighth aspects, determining to trigger generation of the shadow application context includes determining to trigger generation of the shadow application context based at least in part on a maximum latency allowed for transferring support from the application context to the shadow application context.

In a tenth aspect, alone or in combination with one or more of the first through ninth aspects, determining to trigger generation of the shadow application context includes determining to transfer the shadow application context for a period of time, and process 900 includes returning support of the application to the application context at an end of the period of time.

In an eleventh aspect, alone or in combination with one or more of the first through tenth aspects, process 900 includes matching a quality of service of the application when supported by the shadow application context to a quality of service of the application when supported by the application context.

In a twelfth aspect, alone or in combination with one or more of the first through eleventh aspects, the shadow application context includes a present state of the application.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
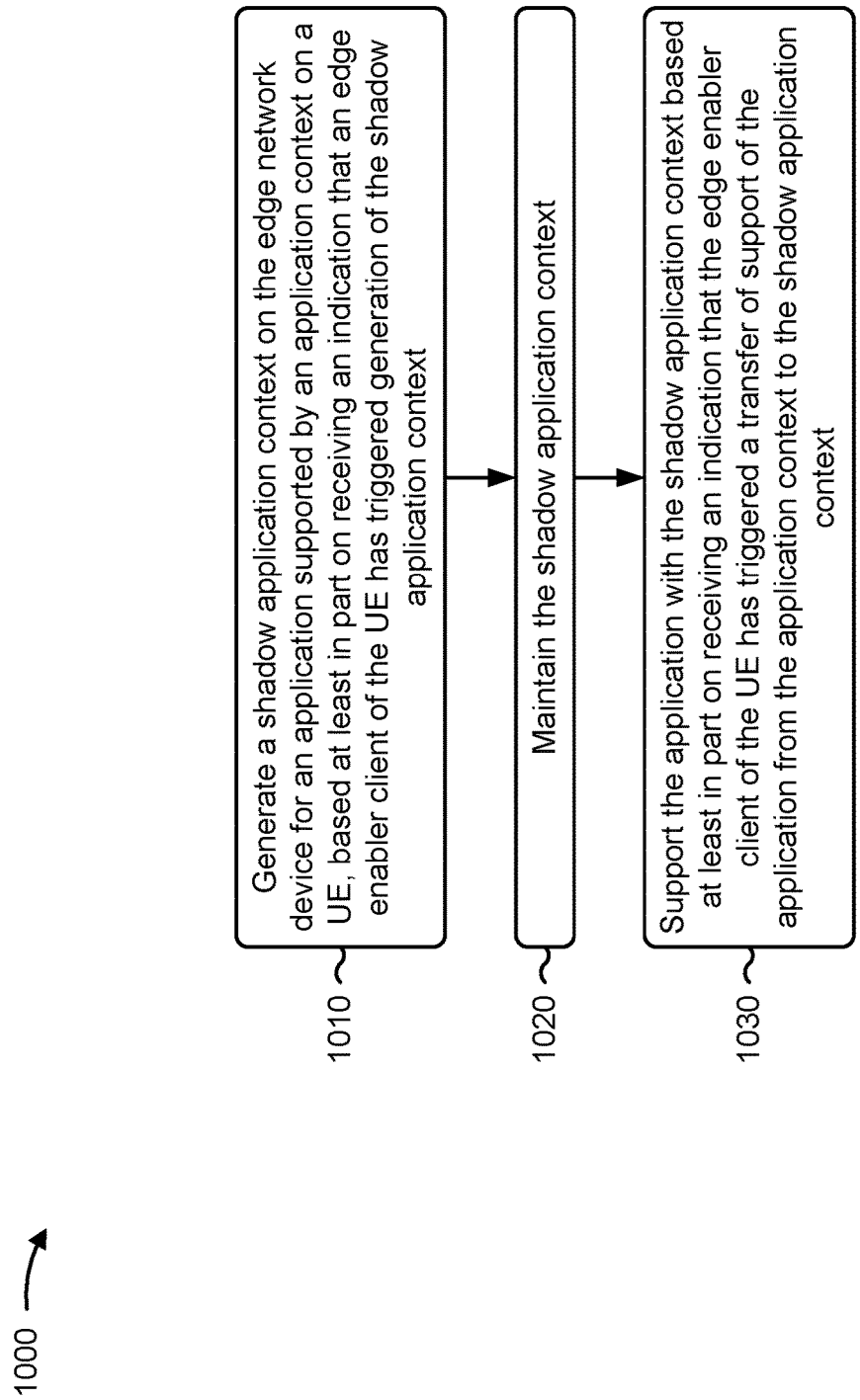
FIG. 10 is a diagram illustrating an example process performed, for example, by an edge network device, in accordance with the present disclosure.

FIG. 10 is a diagram illustrating an example process 1000 performed, for example, by an edge network device, in accordance with the present disclosure. Example process 1000 is an example where the edge network device (e.g., an edge network device 130 depicted in FIGS. 1 and 2, edge network device 320 depicted in FIG. 3, an EES and an EAS depicted in FIGS. 3-8) performs operations associated with edge application context relocation.

As shown in FIG. 10, in some aspects, process 1000 may include generating a shadow application context on the edge network device for an application supported by an application context on a UE, based at least in part on receiving an indication that an edge enabler client of the UE has triggered generation of the shadow application context (block 1010). For example, the edge network device (e.g., using communication unit 294, controller/processor 290, memory 292) may generate a shadow application context on the edge network device for an application supported by an application context on a UE, based at least in part on receiving an indication that an edge enabler client of the UE has triggered generation of the shadow application context, as described above.

As further shown in FIG. 10, in some aspects, process 1000 may include maintaining the shadow application context (block 1020). For example, the edge network device (e.g., using communication unit 294, controller/processor 290, memory 292) may maintain the shadow application context, as described above.

As further shown in FIG. 10, in some aspects, process 1000 may include supporting the application with the shadow application context based at least in part on receiving an indication that the edge enabler client of the UE has triggered a transfer of support of the application from the application context to the shadow application context (block 1030). For example, the edge network device (e.g., using communication unit 294, controller/processor 290, memory 292) may support the application with the shadow application context based at least in part on receiving an indication that the edge enabler client of the UE has triggered a transfer of support of the application from the application context to the shadow application context, as described above.

Process 1000 may include additional aspects, such as any single aspect or any combination of aspects described below and/or in connection with one or more other processes described elsewhere herein.

In a first aspect, maintaining the shadow application context includes replicating the application context into the shadow application context such that the shadow application context is able to support a present state of the application.

In a second aspect, alone or in combination with the first aspect, process 1000 includes matching a quality of service of the application when supported by the shadow application context to a quality of service of the application when supported by the application context.

In a third aspect, alone or in combination with one or more of the first and second aspects, the shadow application context includes a present state of the application.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by an edge network device, in accordance with the present disclosure. Example process 1100 is an example where the edge network device (e.g., edge network device 130 depicted in FIGS. 1 and 2, edge network device 320 depicted in FIG. 3, an EES and an EAS depicted in FIGS. 3-8) performs operations associated with edge application context relocation.

As shown in FIG. 11, in some aspects, process 1100 may include transmitting, to a UE, replication data of an application context that supports an application on the UE, based at least in part on receiving an indication that an edge enabler client of the UE is maintaining a shadow application context that is able to support the application (block 1110). For example, the edge network device (e.g., using communication unit 294, controller/processor 290, memory 292) may transmit, to a UE, replication data of an application context that supports an application on the UE, based at least in part on receiving an indication that an edge enabler client of the UE is maintaining a shadow application context that is able to support the application, as described above.

As further shown in FIG. 11, in some aspects, process 1100 may include discontinuing support of the application with the application context based at least in part on receiving an indication that the edge enabler client of the UE has triggered a transfer of support of the application from the application context to the shadow application context (block 1120). For example, the edge network device (e.g., using communication unit 294, controller/processor 290, memory 292) may discontinue support of the application with the application context based at least in part on receiving an indication that the edge enabler client of the UE has triggered a transfer of support of the application from the application context to the shadow application context, as described above.

Process 1100 may include additional aspects, such as any single aspect or any combination of aspects described below and/or in connection with one or more other processes described elsewhere herein.

In one aspect, the shadow application context includes a present state of the application.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 120 depicted in FIGS. 1 and 2, UE 310 depicted in FIG. 3, an EEC and/or an EAC depicted in FIGS. 4-8) performs operations associated with edge application context replication.

As shown in FIG. 12, in some aspects, process 1200 may include determining to relocate an application context that supports an application on the UE that is served by an edge network device (block 1210). For example, the UE (e.g., using receive processor 258, transmit processor 264, controller/processor 280, memory 282) may determine to relocate an application context that supports an application on the UE that is served by an edge network device, as described above.

As further shown in FIG. 12, in some aspects, process 1200 may include causing relocation of the application context (block 1220). For example, the UE (e.g., using receive processor 258, transmit processor 264, controller/processor 280, memory 282) may cause relocation of the application context, as described above.

Process 1200 may include additional aspects, such as any single aspect or any combination of aspects described below and/or in connection with one or more other processes described elsewhere herein.

In a first aspect, the application context is on the UE, and causing relocation of the application context includes causing the application context to relocate from the UE to the edge network device.

In a second aspect, alone or in combination with the first aspect, causing the application context to relocate from the UE to the edge network device includes transmitting an indication to the edge network device to generate a new application context for the application, and disconnecting the application from the application context based at least in part on receiving an indication that the edge network device has connected the application to the new application context.

In a third aspect, alone or in combination with one or more of the first and second aspects, the application context is on the edge network device, and causing relocation of the application context includes causing the application context to relocate from the edge network device to the UE.

In a fourth aspect, alone or in combination with one or more of the first through third aspects, causing the application context to relocate from the edge network device to the UE includes generating a new application context for the application, connecting the application to the new application context, and transmitting an indication, to the edge network device, to disconnect the application from the application context.

In a fifth aspect, alone or in combination with one or more of the first through fourth aspects, determining to relocate the application context includes determining that a handover of the UE is triggered and that the handover is likely to degrade a quality of service of the application.

In a sixth aspect, alone or in combination with one or more of the first through fifth aspects, determining to relocate the application context includes determining to relocate the application context based at least in part on a quantity of users participating in the application.

In a seventh aspect, alone or in combination with one or more of the first through sixth aspects, determining to relocate the application context includes determining to relocate the application context based at least in part on a maximum latency allowed for relocating the application context.

In an eighth aspect, alone or in combination with one or more of the first through seventh aspects, process 1200 includes matching a quality of service of the application when supported by the new application context to a quality of service of the application when supported by the application context.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
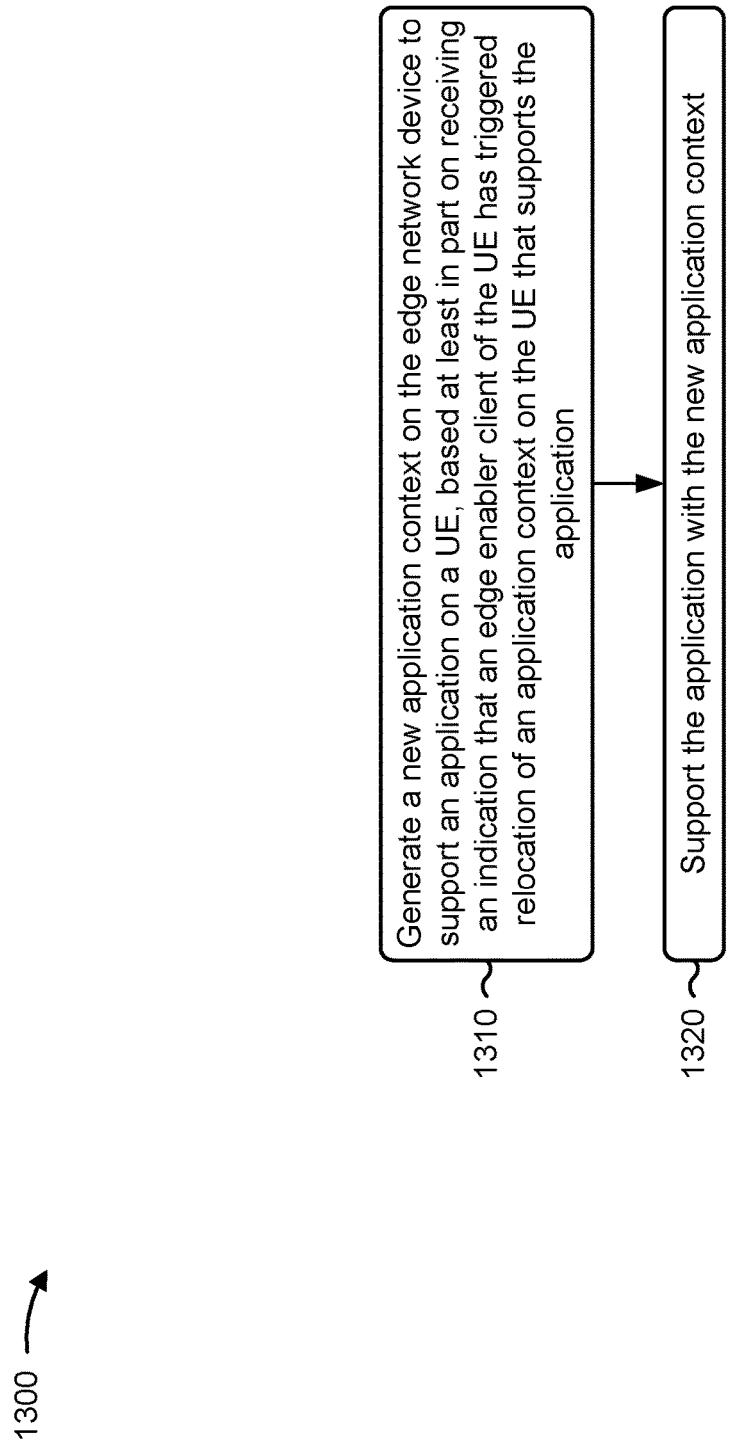
FIG. 13 is a diagram illustrating an example process performed, for example, by an edge network device, in accordance with the present disclosure.

FIG. 13 is a diagram illustrating an example process 1300 performed, for example, by an edge network device, in accordance with the present disclosure. Example process 1300 is an example where the edge network device (e.g., edge network device 130 depicted in FIGS. 1 and 2, edge network device 320 depicted in FIG. 3, an EES and an EAS depicted in FIGS. 3-8) performs operations associated with edge application context replication.

As shown in FIG. 13, in some aspects, process 1300 may include generating a new application context on the edge network device to support an application on a UE, based at least in part on receiving an indication that an edge enabler client of the UE has triggered relocation of an application context on the UE that supports the application (block 1310). For example, the edge network device (e.g., using communication unit 294, controller/processor 290, memory 292) may generate a new application context on the edge network device to support an application on a UE, based at least in part on receiving an indication that an edge enabler client of the UE has triggered relocation of an application context on the UE that supports the application, as described above.

As further shown in FIG. 13, in some aspects, process 1300 may include supporting the application with the new application context (block 1320). For example, the edge network device (e.g., using communication unit 294, controller/processor 290, memory 292) may support the application with the new application context, as described above.

Process 1300 may include additional aspects, such as any single aspect or any combination of aspects described below and/or in connection with one or more other processes described elsewhere herein.

In one aspect, process 1300 includes matching a quality of service of the application when supported by the new application context to a quality of service of the application when supported by the application context.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
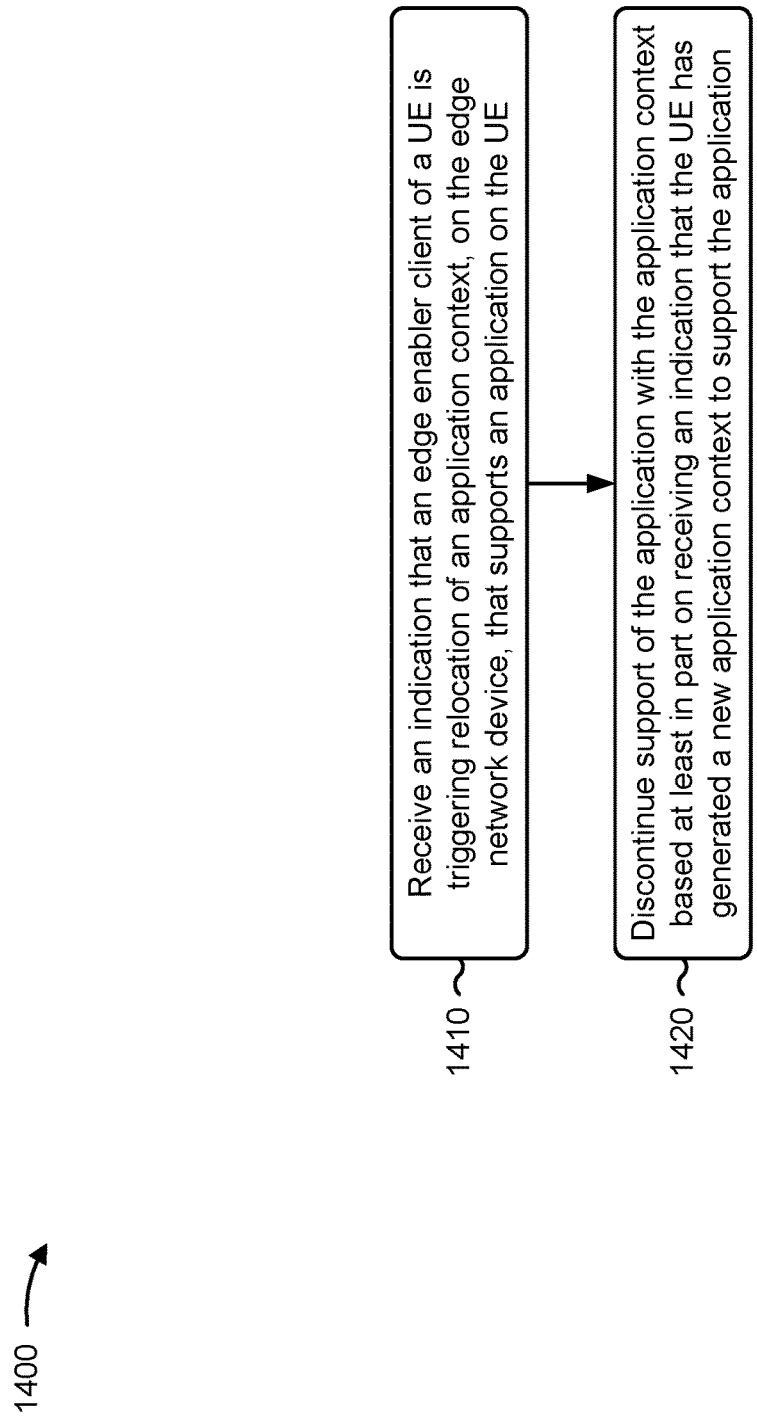
FIG. 14 is a diagram illustrating an example process performed, for example, by an edge network device, in accordance with the present disclosure.

FIG. 14 is a diagram illustrating an example process 1400 performed, for example, by an edge network device, in accordance with the present disclosure. Example process 1400 is an example where the edge network device (e.g., edge network device 130 depicted in FIGS. 1 and 2, edge network device 320 depicted in FIG. 3, an EES and an EAS depicted in FIGS. 3-8) performs operations associated with edge application context replication.

As shown in FIG. 14, in some aspects, process 1400 may include receiving an indication that an edge enabler client of a UE is triggering relocation of an application context, on the edge network device, that supports an application on the UE (block 1410). For example, the edge network device (e.g., using communication unit 294, controller/processor 290, memory 292) may receive an indication that an edge enabler client of a UE is triggering relocation of an application context, on the edge network device, that supports an application on the UE, as described above.

As further shown in FIG. 14, in some aspects, process 1400 may include discontinuing support of the application with the application context based at least in part on receiving an indication that the UE has generated a new application context to support the application (block 1420). For example, the edge network device (e.g., using communication unit 294, controller/processor 290, memory 292) may discontinue support of the application with the application context based at least in part on receiving an indication that the UE has generated a new application context to support the application, as described above.

Process 1400 may include additional aspects, such as any single aspect or any combination of aspects described below and/or in connection with one or more other processes described elsewhere herein.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: triggering generation of a shadow application context to support an application that is associated with an application context and that is served by an edge network device; and transferring, by an edge enabler client of the UE, support of the application from the application context to the shadow application context based at least in part on the generation of the shadow application context.

Aspect 2: The method of Aspect 1, wherein the application context is on the UE and the shadow application context is on the edge network device.

Aspect 3: The method of Aspect 2, wherein transferring support of the application includes: transmitting a last update of data for the shadow application context; connecting the application to the shadow application context; and disconnecting the application from the application context.

Aspect 4: The method of any of Aspect 1, wherein the application context is on the edge network device and the shadow application context is on the UE, and wherein the method further comprises maintaining the shadow application context.

Aspect 5: The method of Aspect 4, wherein maintaining the shadow application context includes replicating the application context as the shadow application context such that the shadow application context is able to support a present state of the application.

Aspect 6: The method of Aspect 4, wherein transferring support of the application includes: receiving a last update of data for the shadow application context; and connecting the application to the shadow application context.

Aspect 7: The method of any of Aspects 1-6, wherein the shadow application context includes a present state of the application.

Aspect 8: The method of any of Aspects 1-7, further comprising determining, by the edge enabler client, to trigger generation of the shadow application context based at least in part on a handover of the UE being triggered and a determination that the handover is likely to degrade a quality of service of the application.

Aspect 9: The method of any of Aspects 1-8, further comprising determining, by the edge enabler client, to trigger generation of the shadow application context based at least in part on a quantity of users participating in the application.

Aspect 10: The method of any of Aspects 1-9, further comprising determining, by the edge enabler client, to trigger generation of the shadow application context based at least in part on a maximum latency allowed for transferring support from the application context to the shadow application context.

Aspect 11: The method of any of Aspects 1-10, wherein transferring support of the application includes transferring support of the application to the shadow application context for a period of time, and wherein the method further comprises returning support of the application to the application context at an end of the period of time.

Aspect 12: The method of any of Aspects 1-11, further comprising matching a quality of service of the application when supported by the shadow application context to a quality of service of the application when supported by the application context.

Aspect 13: A method of wireless communication performed by an edge network device, comprising: generating a shadow application context on the edge network device for an application supported by an application context on a user equipment (UE), based at least in part on receiving an indication that an edge enabler client of the UE has triggered generation of the shadow application context; maintaining the shadow application context; and supporting the application with the shadow application context based at least in part on receiving an indication that the edge enabler client of the UE has triggered a transfer of support of the application from the application context to the shadow application context.

Aspect 14: The method of Aspect 13, wherein maintaining the shadow application context includes replicating the application context into the shadow application context such that the shadow application context is able to support a present state of the application.

Aspect 15: The method of Aspect 13 or 14, further comprising matching a quality of service of the application when supported by the shadow application context to a quality of service of the application when supported by the application context.

Aspect 16: The method of any of Aspects 13-15, wherein the shadow application context includes a present state of the application.

Aspect 17: A method of wireless communication performed by an edge network device, comprising: transmitting, to a user equipment (UE), replication data of an application context that supports an application on the UE, based at least in part on receiving an indication that an edge enabler client of the UE is maintaining a shadow application context that is able to support the application; and discontinuing support of the application with the application context based at least in part on receiving an indication that the edge enabler client of the UE has triggered a transfer of support of the application from the application context to the shadow application context.

Aspect 18: The method of Aspect 17, wherein the shadow application context includes a present state of the application.

Aspect 19: A method of wireless communication performed by a user equipment (UE), comprising: determining, by an edge enabler client of the UE, to relocate an application context that supports an application on the UE that is served by an edge network device; and causing, by the edge enabler client, relocation of the application context.

Aspect 20: The method of Aspect 19, wherein the application context is on the UE, and wherein causing relocation of the application context includes causing the application context to relocate from the UE to the edge network device.

Aspect 21: The method of Aspect 20, wherein causing the application context to relocate from the UE to the edge network device includes: transmitting an indication to the edge network device to generate a new application context for the application; and disconnecting the application from the application context based at least in part on receiving an indication that the edge network device has connected the application to the new application context.

Aspect 22: The method of Aspect 19, wherein the application context is on the edge network device, and wherein causing relocation of the application context includes causing the application context to relocate from the edge network device to the UE.

Aspect 23: The method of Aspect 22, wherein causing the application context to relocate from the edge network device to the UE includes: generating a new application context for the application; connecting the application to the new application context; and transmitting an indication, to the edge network device, to disconnect the application from the application context.

Aspect 24: The method of Aspect 23, further comprising matching a quality of service of the application when supported by the new application context to a quality of service of the application when supported by the application context.

Aspect 25: The method of any of Aspects 19-24, wherein determining to relocate the application context includes determining, by the edge enabler client, that a handover of the UE is triggered and that the handover is likely to degrade a quality of service of the application.

Aspect 26: The method of any of Aspects 19-25, wherein determining to relocate the application context includes determining, by the edge enabler client, to relocate the application context based at least in part on a quantity of users participating in the application.

Aspect 27: The method of any of Aspects 19-26, wherein determining to relocate the application context includes determining, by the edge enabler client, to relocate the application context based at least in part on a maximum latency allowed for relocating the application context.

Aspect 28: A method of wireless communication performed by an edge network device, comprising: generating a new application context on the edge network device to support an application on a user equipment (UE), based at least in part on receiving an indication that an edge enabler client of the UE has triggered relocation of an application context on the UE that supports the application; and supporting the application with the new application context.

Aspect 29: The method of Aspect 28, further comprising matching a quality of service of the application when supported by the new application context to a quality of service of the application when supported by the application context.

Aspect 30: A method of wireless communication performed by an edge network device, comprising: receiving an indication that an edge enabler client of a user equipment (UE) is triggering relocation of an application context, on the edge network device, that supports an application on the UE; and discontinuing support of the application with the application context based at least in part on receiving an indication that the UE has generated a new application context to support the application.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the memory and the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories;
    one or more processors coupled to the one or more memories; and
    instructions stored in the one or more memories and operable, when executed by the one or more processors, to cause the UE to:
        trigger generation of a shadow application context to support an application associated with an application context and that is served by an edge network device; and
        transfer, based at least in part on the generation of the shadow application context, support of the application from the application context to the shadow application context for a period of time, wherein support of the application is returned to the application context at an end of the period of time.

2. The UE of claim 1, wherein the application context is on the UE and the shadow application context is on the edge network device.

3. The UE of claim 2, wherein the one or more processors, to transfer support of the application, are configured to:
    transmit a last update of data for the shadow application context;
    connect the application to the shadow application context; and
    disconnect the application from the application context.

4. The UE of claim 1, wherein the application context is on the edge network device and the shadow application context is on the UE, and wherein the one or more processors are configured to maintain the shadow application context.

5. The UE of claim 4, wherein the one or more processors, to maintain the shadow application context, are configured to replicate the application context as the shadow application context such that the shadow application context is able to support a present state of the application.

6. The UE of claim 4, wherein the one or more processors, to transfer support of the application, are configured to:
    receive a last update of data for the shadow application context; and
    connect the application to the shadow application context.

7. The UE of claim 1, wherein the shadow application context includes a present state of the application.

8. The UE of claim 1, wherein the one or more processors are configured to trigger generation of the shadow application context based at least in part on a handover of the UE being triggered and a determination that the handover is likely to degrade a quality of service of the application.

9. The UE of claim 1, wherein the one or more processors are configured to trigger generation of the shadow application context based at least in part on a quantity of users participating in the application.

10. The UE of claim 1, wherein the one or more processors are configured to trigger generation of the shadow application context based at least in part on a maximum latency allowed for transferring support from the application context to the shadow application context.

11. The UE of claim 1, wherein the one or more processors are configured to return support of the application to the application context at the end of the period of time.

12. The UE of claim 1, wherein the one or more processors are further configured to match a quality of service of the application when supported by the shadow application context to a quality of service of the application when supported by the application context.

13. An edge network device for wireless communication, comprising:
    one or more memories;
    one or more processors coupled to the one or more memories; and instructions stored in the one or more memories and operable, when executed by the one or more processors, to cause the edge network device to:

generate a shadow application context on the edge network device for an application supported by an application context on a user equipment (UE), based at least in part on receiving an indication that an edge enabler client of the UE has triggered generation of the shadow application context;

maintain the shadow application context; and support, for a period of time, the application with the shadow application context based at least in part on receiving an indication that the edge enabler client of the UE has triggered a transfer of support of the application from the application context to the shadow application context, wherein support of the application is returned to the application context at an end of the period of time.

14. The edge network device of claim 13, wherein the one or more processors, to maintain the shadow application context, are configured to replicate the application context into the shadow application context such that the shadow application context is able to support a present state of the application.

15. The edge network device of claim 13, wherein the one or more processors are further configured to match a quality of service of the application when supported by the shadow application context to a quality of service of the application when supported by the application context.

16. The edge network device of claim 13, wherein the shadow application context includes a present state of the application.

17. A user equipment (UE) for wireless communication, comprising:

one or more memories;

one or more processors coupled to the one or more memories; and instructions stored in the one or more memories and operable, when executed by the one or more processors, to cause the UE to:

determine, using an edge enabler client (EEC) of the UE, to relocate an application context that supports an application on the UE that is served by an edge network device;

provide, using the EEC and to an edge application client (EAC) of the UE, a command to transfer the application context; and cause, using the EAC, relocation of the application context from the UE to the edge network device.

18. The UE of claim 17, wherein the one or more processors, to cause relocation of the application context from the UE to the edge network device, are configured to:

transmit an indication to the edge network device to generate a new application context for the application; and disconnect the application from the application context based at least in part on receiving an indication that the edge network device has connected the application to the new application context.

19. The UE of claim 17, wherein the one or more processors, to determine to relocate the application context, are configured to determine that a handover of the UE is triggered and that the handover is likely to degrade a quality of service of the application.

20. The UE of claim 17, wherein the one or more processors, to determine to relocate the application context, are configured to determine to relocate the application context based at least in part on a quantity of users participating in the application.

21. The UE of claim 17, wherein the one or more processors, to determine to relocate the application context, are configured to determine to relocate the application context based at least in part on a maximum latency allowed for relocating the application context.

22. A method of wireless communication performed by a user equipment (UE), comprising:

triggering generation of a shadow application context to support an application associated with an application context and that is served by an edge network device; and transferring, based at least in part on the generation of the shadow application context, support of the application from the application context to the shadow application context for a period of time, wherein support of the application is returned to the application context at an end of the period of time.

23. The method of claim 22, wherein the application context is on the UE and the shadow application context is on the edge network device.

24. The method of claim 22, wherein transferring support of the application from the application context to the shadow application context comprises:

transmitting a last update of data for the shadow application context;

connecting the application to the shadow application context; and disconnecting the application from the application context.

25. The method of claim 22, wherein the application context is on the edge network device and the shadow application context is on the UE, and wherein the method further comprises maintaining the shadow application context.

26. The method of claim 22, wherein the shadow application context includes a present state of the application.

27. A method of wireless communication performed by an edge network device, comprising:

generating a shadow application context on the edge network device for an application supported by an application context on a user equipment (UE), based at least in part on receiving an indication that an edge enabler client of the UE has triggered generation of the shadow application context;

maintaining the shadow application context; and supporting, for a period of time, the application with the shadow application context based at least in part on receiving an indication that the edge enabler client of the UE has triggered a transfer of support of the application from the application context to the shadow application context, wherein support of the application is returned to the application context at an end of the period of time.

28. The method of claim 27, wherein the shadow application context includes a present state of the application.

29. A method of wireless communication performed by a user equipment (UE), comprising:

determining, using an edge enabler client (EEC) of the UE, to relocate an application context that supports an application on the UE that is served by an edge network device;

providing, using the EEC and to an edge application client (EAC) of the UE, a command to transfer the application context; and causing, using the EAC, relocation of the application context from the UE to the edge network device.

30. The method of claim 29, wherein determining to relocate the application context comprises:
  determining to relocate the application context based at least in part on a quantity of users participating in the application.

\* \* \* \* \*